United States Patent
Donlin et al.

(10) Patent No.: US 7,849,311 B2
(45) Date of Patent: Dec. 7, 2010

(54) COMPUTER SYSTEM WITH DUAL OPERATING MODES

(75) Inventors: Patrick J. Donlin, Deephaven, MN (US); Michael Raymond, Eagan, MN (US)

(73) Assignee: Silicon Graphics International, Fremont, CA (US)

( * ) Notice: Subject to any disclaimer, the term of this patent is extended or adjusted under 35 U.S.C. 154(b) by 1667 days.

(21) Appl. No.: 11/079,409

(22) Filed: Mar. 15, 2005

(65) Prior Publication Data

US 2006/0212945 A1    Sep. 21, 2006

(51) Int. Cl.
*G06F 9/00* (2006.01)
*G06F 7/04* (2006.01)
*G06F 17/30* (2006.01)

(52) U.S. Cl. ............... 713/164; 713/165; 713/166; 713/167; 726/26; 726/27

(58) Field of Classification Search ............ 713/164, 713/165, 166, 167
See application file for complete search history.

(56) References Cited

U.S. PATENT DOCUMENTS

2004/0139346 A1 * 7/2004 Watt et al. ............ 713/200

OTHER PUBLICATIONS

Whitepaper, "Linux Vserver", http://linux-vserver.org/, Feb. 22, 2005.

* cited by examiner

*Primary Examiner*—Benjamin E Lanier
(74) *Attorney, Agent, or Firm*—Baker Botts L.L.P.

(57) ABSTRACT

The present invention is a system that switches between non-secure and secure modes by making processes, applications and data for the non-active mode unavailable to the active mode. That is, non-secure processes, applications and data are not accessible when in the secure mode and visa versa. This is accomplished by creating dual hash tables where one table is used for secure processes and one for non-secure processes. A hash table pointer is changed to point to the table corresponding to the mode. The path-name look-up function that traverses the path name tree to obtain a device or file pointer is also restricted to allow traversal to only secure devices and file pointers when in the secure mode and only to non-secure devices and files in the non-secure mode. The process thread run queue is modified to include a state flag for each process that indicates whether the process is a secure or non-secure process. A process scheduler traverses the queue and only allocates time to processes that have a state flag that matches the current mode. Running processes are marked to be idled and are flagged as unrunnable, depending on the security mode, when the process reaches an intercept point. The switch operation validates the switch process and pauses the system for a period of time to allow all running processes to reach an intercept point and be marked as unrunnable. After all the processes are idled, the hash table pointer is changed, the look-up control is changed to allow traversal of the corresponding security mode branch of the file name path tree, and the scheduler is switched to allow only threads that have a flag that corresponds to the security mode to run. The switch process is then put to sleep and a master process, either secure or non-secure, depending on the mode, is then awakened.

21 Claims, 17 Drawing Sheets

COMPUTER SYSTEM WITH DUAL OPERATING MODES

GOVERNMENT LICENSE RIGHTS

The U.S. Government has a paid-up license in this invention and the right in limited circumstances to require the patent owner to license others on reasonable terms as provided for by the terms of Contract No. GS-35F-0091K (RFP HS-02-002) awarded by the Department of Defense.

BACKGROUND OF THE INVENTION

1. Field of the Invention

The present invention is directed to a computer system with an operating system secure scheduler and, more particularly to a single system that is capable of hosting secure and non-secure applications while maintaining the secure environment through a scheduler that determines the applications that can run, the devices that can be accessed, etc. based on the security mode of the system

2. Description of the Related Art

Today many individuals are required to perform secure work and use secure applications and perform non-secure work using non-secure applications, such as email. It is conventional wisdom that it is not possible to combine a secure system and a non-secure system in a single computing platform. The typical solution is to provide two separate systems, a secure system and a non-secure system. When an individual is performing non-secure work the non-secure system is used. To perform secure work, the user must log off of the non-secure system, physically move to the secure system and log into the secure system. Such dual systems are difficult to maintain, increase administrative overhead and result in reduced productivity for the individuals involved.

What is needed is a system that allows both types of applications to safely and securely co-exist on the same platform.

BRIEF DESCRIPTION OF THE INVENTION

It is an aspect of the present invention to provide a single system that allows secure and non-secure operations on the same platform.

It is another aspect of the present invention to provide a system that does not allow and provides no opportunity to access secure processes, secure data, etc. when the system is running in a non-secure mode and visa versa.

It is also an aspect of the present invention to provide a system in which data structures prevent access to data and processes that do not correspond to the current mode.

It is an aspect of the present invention to provide data structures that prevent access to designated input/output (I/O) pathways and I/O devices that do not correspond to the current mode.

The above aspects can be attained by a system that switches between non-secure and secure modes by making processes and data for the non-active mode unavailable to the active mode. This prevents user from accessing data or processes non-corresponding to the current mode. This is accomplished in one embodiment by creating dual hash tables where one table is used for secure processes and one for non-secure processes. The path-name look-up function that traverses the path name tree to obtain a device or file pointer in another embodiment is also restricted to allow traversal to obtain a pointer to only secure devices and files when in the secure mode and to only non-secure devices and files in the non-secure mode. The process thread run queue in an embodiment is modified to include a state flag for each process that indicates whether the process is a secure or non-secure process. A process scheduler traverses the queue and only allocates time to processes that have a state flag that matches the current mode. A macro level switch between modes in the kernel is performed. Running processes are marked to be idled and are flagged as unrunnable, depending on the security mode, when the process reaches an intercept point. I/O paths of the running processes that are designated as accessible only by this security mode are also disabled. The switch operation, in an embodiment, pauses the system for a period of time to allow all running processes to reach an intercept point and be marked as unrunnable. After all the processes are idled, in an embodiment, the hash table pointer is changed, the look-up control is changed to allow traversal of the corresponding security mode branch of the tree, and the scheduler is switched to allow only threads that have a flag that corresponds to the security mode to run. I/O paths of the running processes that are designated as assessable only by this security mode or level are enabled. The master process, either secure or non-secure, depending on the mode is then awakened. Page swapping is also securely performed by swapping pages using devices with the same security level.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
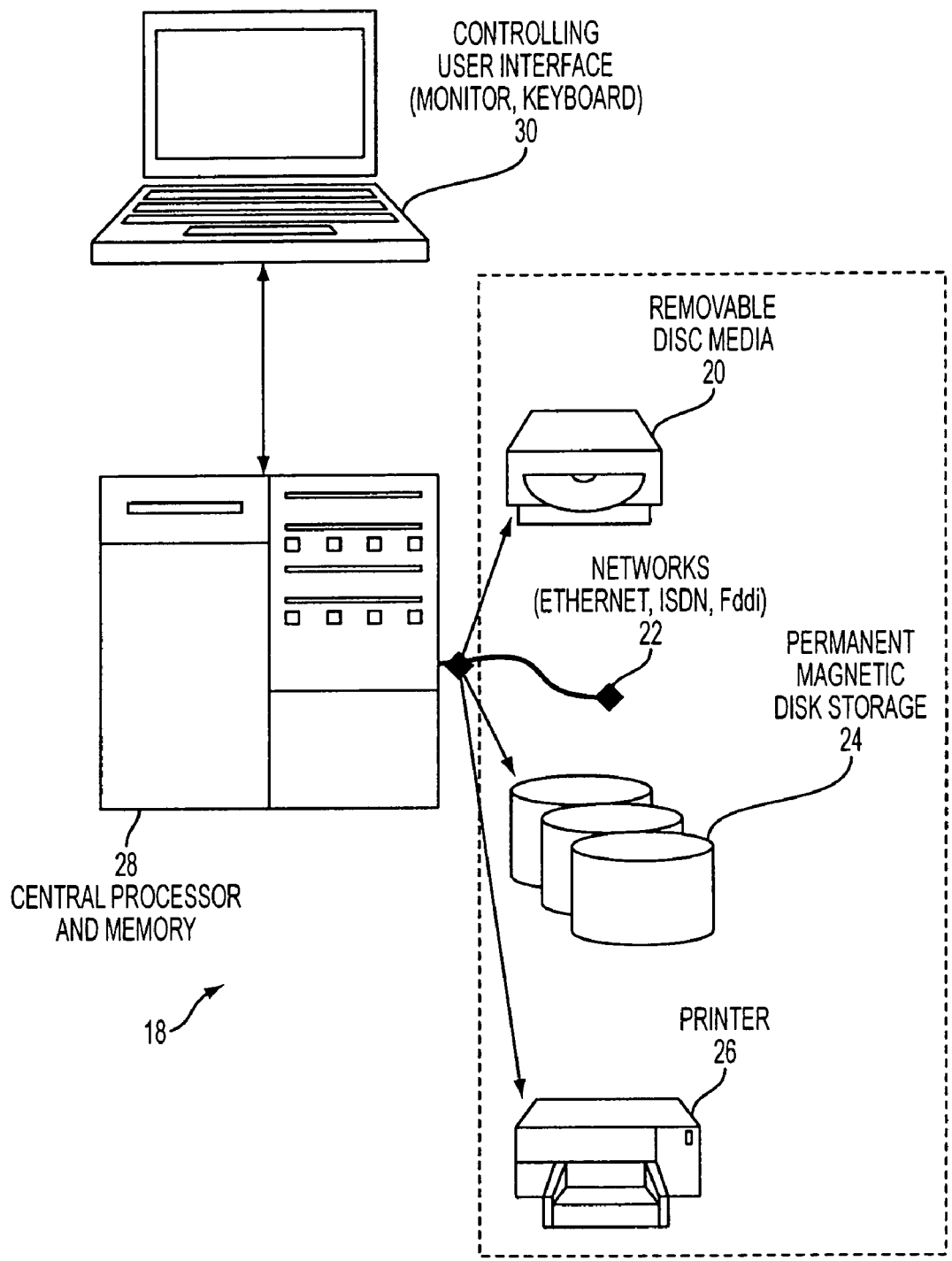
FIG. 1 depicts a conventional non-secure system.

A typical computer system 18, as depicted in FIG. 1, includes various types of devices such as removable storage media 20, network an communication connections 22, permanent storage 24 and output device like a printer 26 coupled to a central processor and memory 28 where a user accesses and using the components and their contents via an interface 30, such as a monitor and keyboard, as they perform their work.

Figure 2:
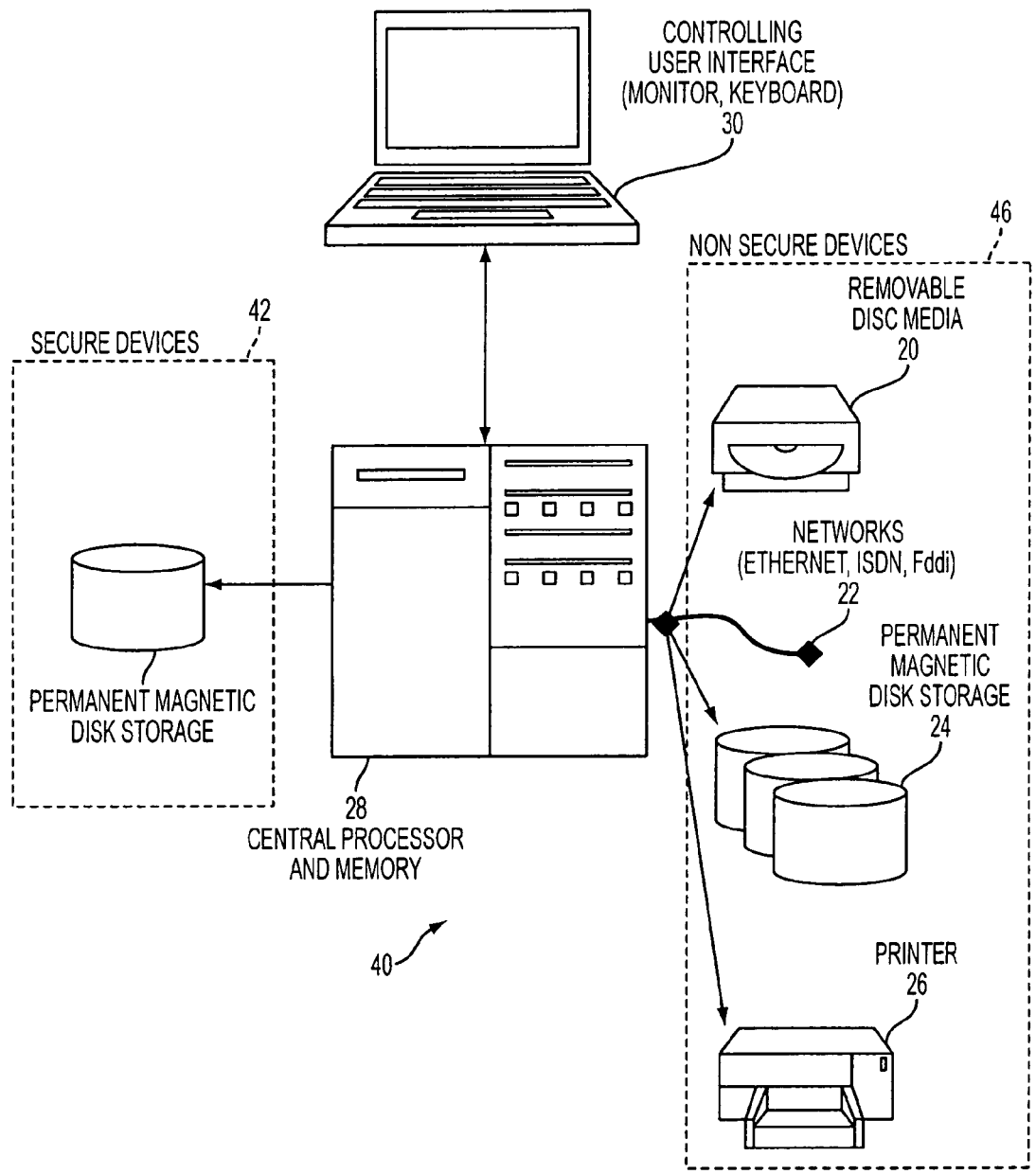
FIG. 2 illustrates system partitioning in a system with secure and non-secure devices.

In a system 40 according to an embodiment of the present invention, as depicted in FIG. 2, the components are physically partitioned into secure devices 42, such as permanent disk storage 44, and non-secure devices 46. Because the system 40 includes both secure components and their secure contents as well as non-secure components, the system 40 is required to prevent a user from accessing secure components and information while in a non-secure mode, so that the transfer of secure information form the secure components to non-secure components, such as from permanent storage to a printer, is prevented. To accomplish this various structures and processes, as described in more detail herein are provided.

Figure 3:
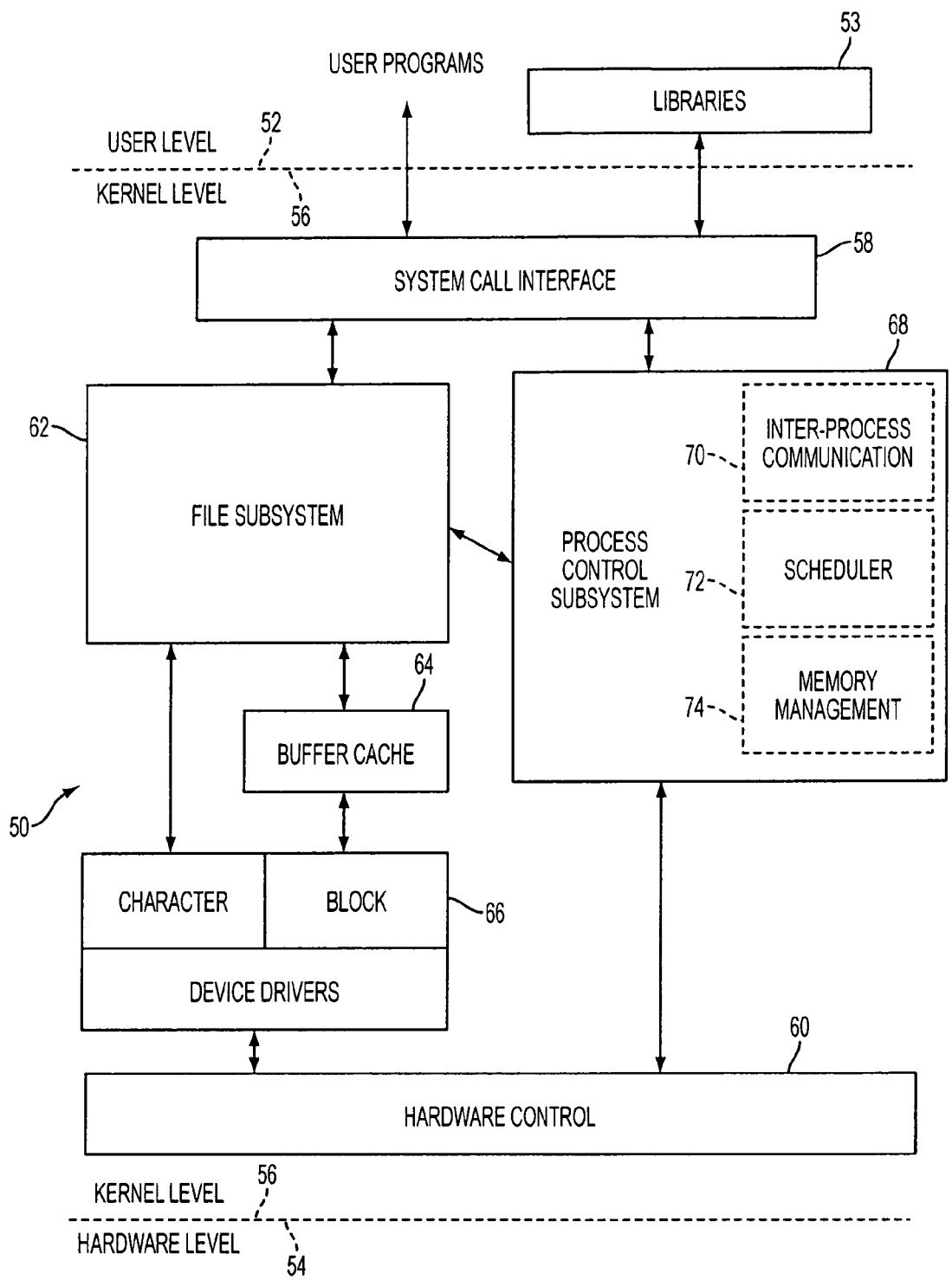
FIG. 3 illustrates a typical kernel.

A typical operating system based computing environment 50, such as the UNIX environment to which the embodiments of the present invention can be applied, includes several levels as depicted in FIG. 3. Similar environments can be found in other operating system environments and the present can be applied to those environments as well as others that are less similar. In the typical operating system environment, a user space or level 52 is provided in which user applications and programs are executed and in which the various libraries 53 data, programs, etc. are assessed and used. A hardware space or level 54 is also provided where the hardware, such as depicted in FIGS. 1 and 2, resides and operates. Between the user level 52 and the hardware level 54, exists a kernel space or level 56 in which the kernel of the system operates.

The kernel is a program that constitutes the central core of a computer operating system. It has complete control over everything that occurs in the system. The kernel is the first part of the operating system to load into the main memory (RAM) during booting, and it remains in the memory for the entire duration of the computer session. Because the code that makes up the kernel is needed continuously, it is usually loaded into a protected area of memory, which prevents it from being overwritten by other, less frequently used parts of the operating system or by application programs. Access to the kernel is limited to individuals with a proper level of authority, which is the "superuser". The kernel performs its tasks (e.g. executing processes and handling hardware and software interrupts) in kernel space, whereas everything a user normally does (e.g. writing text in a text editor or running graphical programs) is done in user space. This separation is provided in order to prevent user data and kernel data from interfering with each other and thereby diminishing performance or causing the system to become unstable (and possibly crashing). The kernel provides basic services for all other parts of the operating system, typically including memory management, process management, file management and I/O (input/output) management (i.e., accessing the peripheral devices). These services are requested by other parts of the operating system or by application programs through a specified set of program interfaces referred to as system calls.

Process management is the part of the kernel that ensures that each process gets its turn to run on the processor 28 and that the individual processes do not interfere with each other by writing to their areas of memory.

The contents of a kernel vary considerably according to the operating system, but they typically include a scheduler, which determines how the various processes share the kernel's processing time (including in what order), a supervisor, which grants use of the computer to each process when it is scheduled, an interrupt handler, which handles all requests from the various hardware devices (such as disk drives and the keyboard) that compete for the kernel's services and a memory manager, which allocates the system's address spaces among all users of the kernel's services.

The typical UNIX kernel level 56 (see FIG. 3) includes a system call interface 58 that interacts with the user level 52 and hardware control 60 that interacts with the hardware level 54. The kernel level 56 also includes a file sub-system 62 that controls access to files within the system as well as access to the various hardware devices, such as a printer, through conventional buffers 64 and drivers 66. The UNIX kernel level 56 also includes a process control system 68 that controls the processes and includes an inter-process communication task 70, a scheduler 72 and a memory manager 74.

Figure 4:
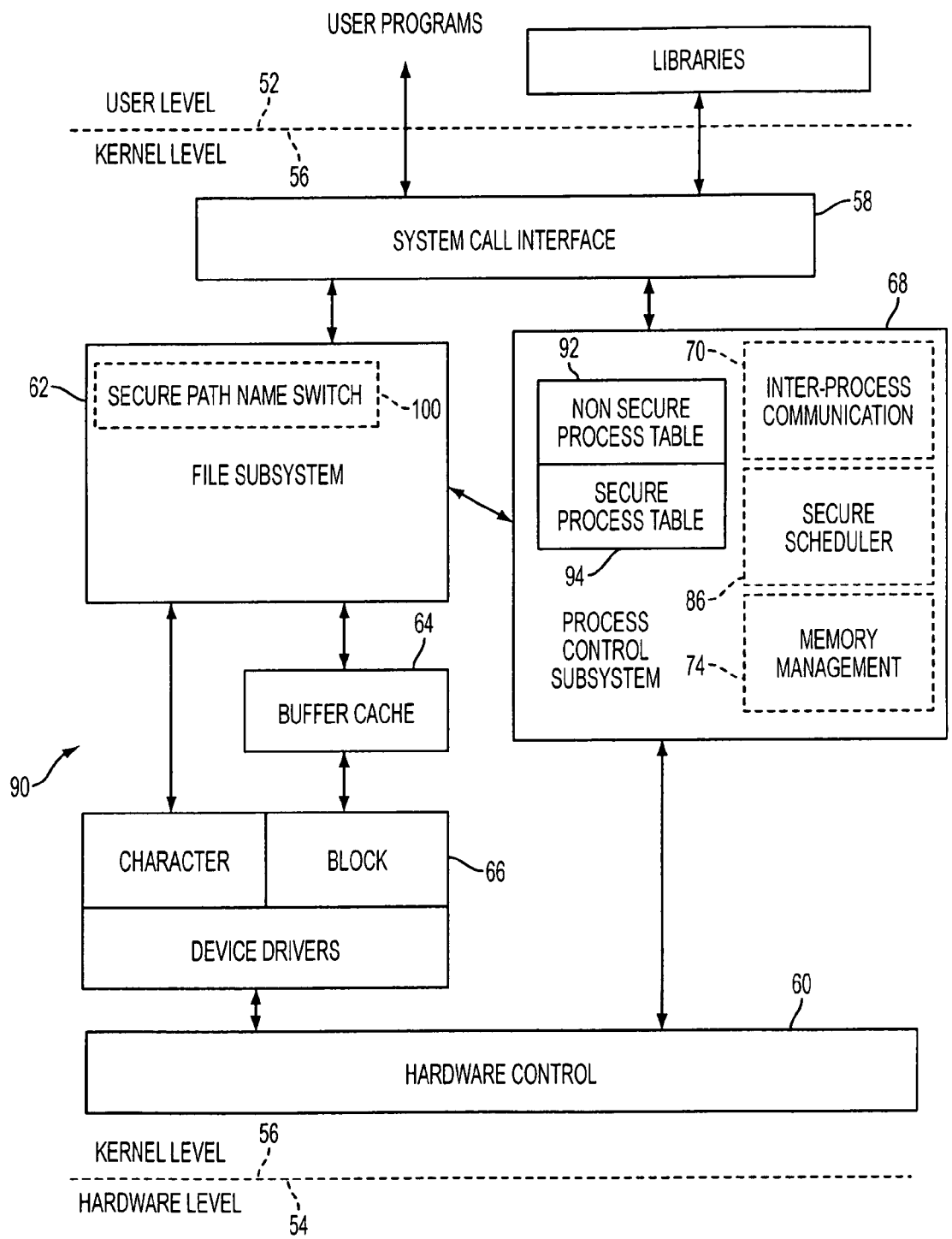
FIG. 4 depicts a kernel according to the present invention.

The system 90 of the present invention makes changes and additions to various ones of the kernel components discussed above as shown in FIG. 4. An embodiment of the present invention provides, in the process control subsystem 68, a set of process tables 92, 94 including a secure process table 94 and an access mechanism (see FIGS. 6 and 7) to access the tables based on the security mode. An embodiment includes a secure scheduler 96 (see FIG. 9) that executes secure processes or non-secure process responsive to the security mode. An embodiment also includes a secure path name switch 100 (see FIG. 11) that provides paths to secure and non-secure files and devices based on the security mode. A switch process (see 12) is also provided that allows the single system or platform to switch between non-secure mode and secure mode.

A conventional UNIX process table 110 (see FIG. 5) in the kernel has a global pointer or hash table pointer 112 that points to the table 114 and each entry in the table essentially points to a system process (e.g. Process 1 . . . Process X) via a hash function (Index=HASH(pid)) that maps from index to location. A conventional operating system process accesses and uses the hash table to access the processes pointed-to by the table.

Figure 5:
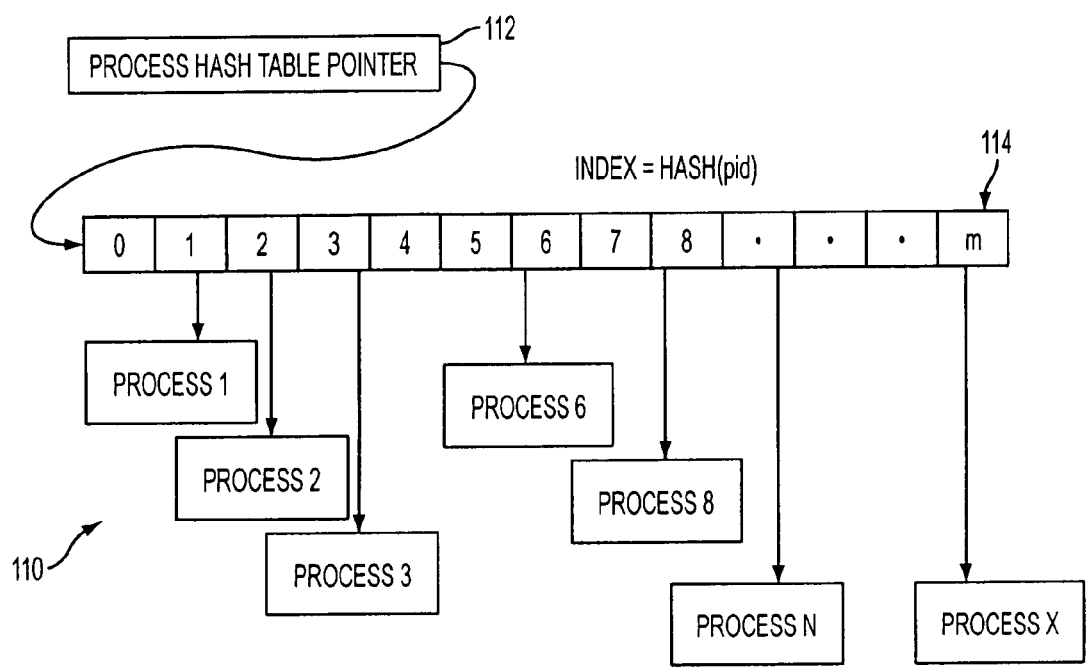
FIG. 5 shows a conventional process table model.
Figure 6:
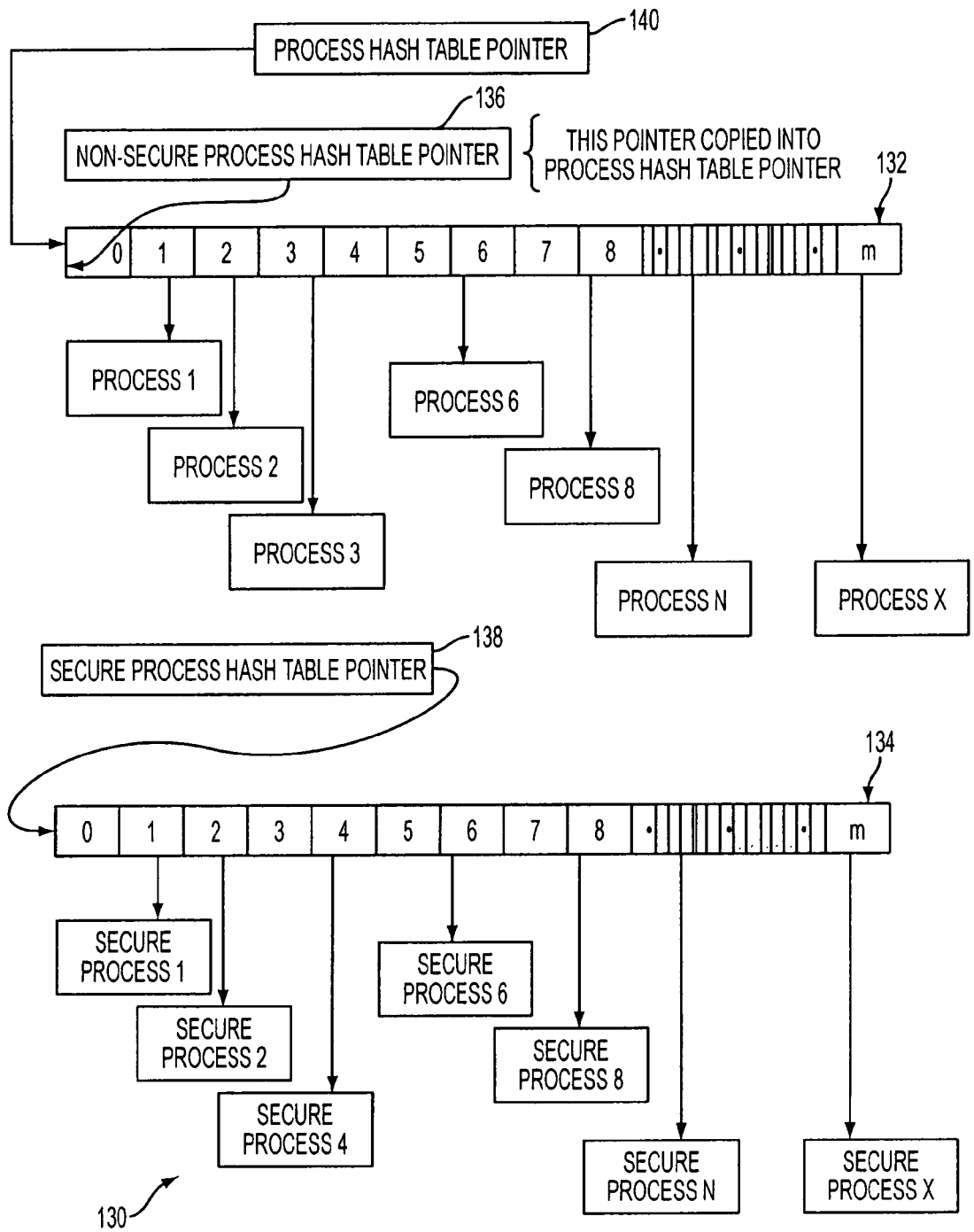
FIGS. 6 and 7 depict process table organization according to the present invention in non-secure mode (FIG. 6) and in secure mode (FIG. 7).
Figure 7:
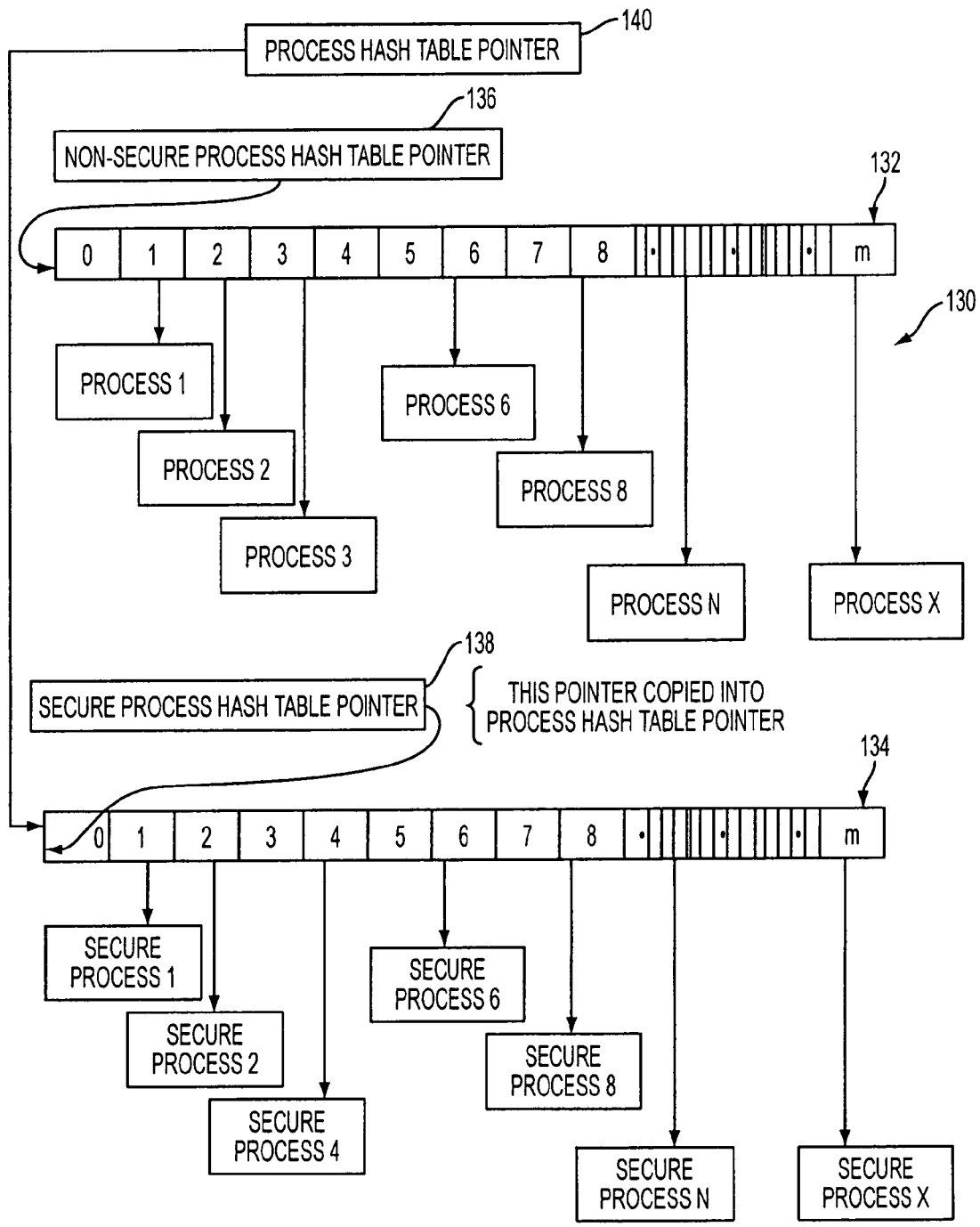

The process table data structure 130 of the present invention (see FIG. 6) preferably includes two hash tables in the kernel, a non-secure hash table 132 that points to non-secure processes such as in FIG. 5 and a secure hash table 134 that points to secure processes (e.g. Secure Process 1 . . . Secure Process X). Only secure processes are allowed to be entered into the secure table 134 and visa versa. Each of the tables includes corresponding table pointers 136 and 138 residing in the kernel. These pointers 136 and 138 are transferred to the process hash table pointer 140 also located in the kernel depending on the security mode. That is, during non-secure operations pointer 136 is transferred to pointer 140 and table 132 is used and during secure operations pointer 138 is transferred to pointer 140 and table 134 is used. FIG. 6 particularly depicts the pointer 140 pointing to the non-secure table 132 while FIG. 7 depicts pointer 140 containing the contents of pointer 138 necessary to point to table 134. Once the pointer 140 is switched to either the secure contents (138) on non-secure contents (136) the operating system uses the conventional operations to use the hash table. By having two tables, when the system is in one or the other of the modes, the system does not even "know" that processes of the other mode exist and any user who somehow obtains access to the current table cannot start, run or locate a process corresponding to the other mode.

Figure 8:
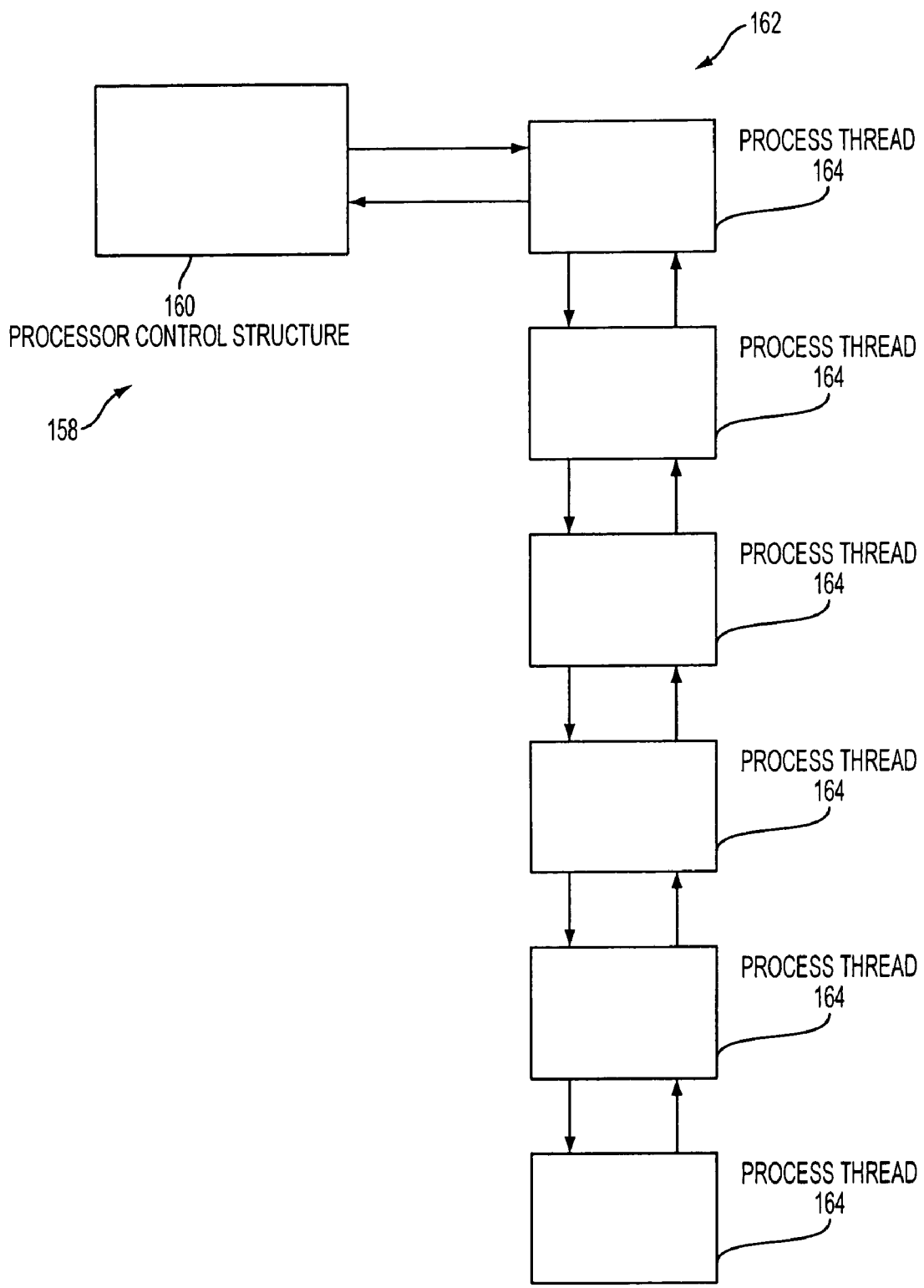
FIG. 8 illustrates a conventional scheduler run queue organization.

The conventional UNIX run queue organization scheduler 158 located in the kernel includes a process control structure 160 (see FIG. 8) linked to a run queue 162 where the run queue comprises a doubly linked list of all process thread structures 164 including run condition flags. All of the process threads 164 depicted in this queue 162 are runnable (and non-secure) and the scheduler time sharing algorithms conventionally determine the order and amount of time each runnable process is given.

Figure 9:
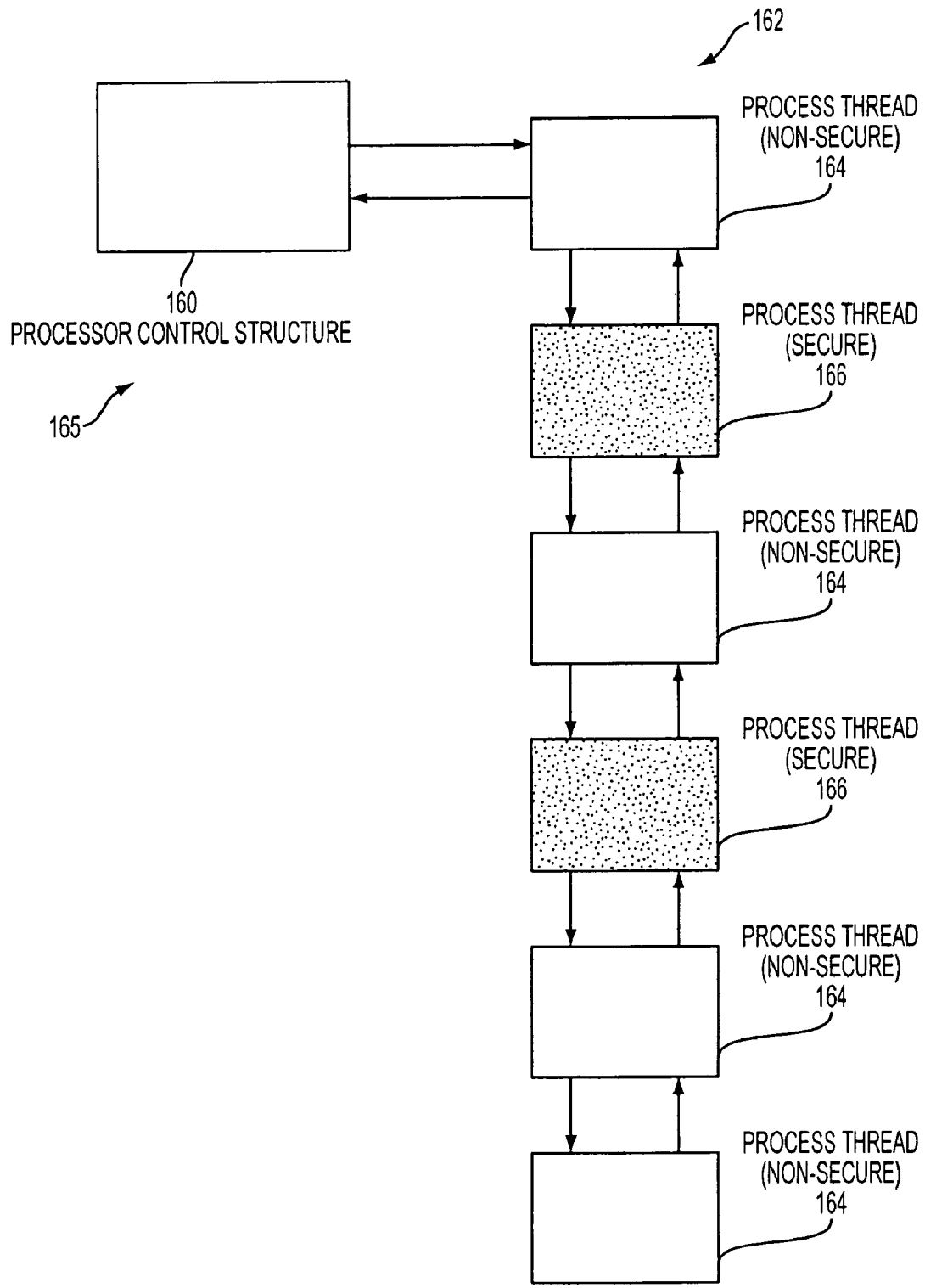
FIG. 9 depicts a scheduler according to the present invention.
Figure 14:
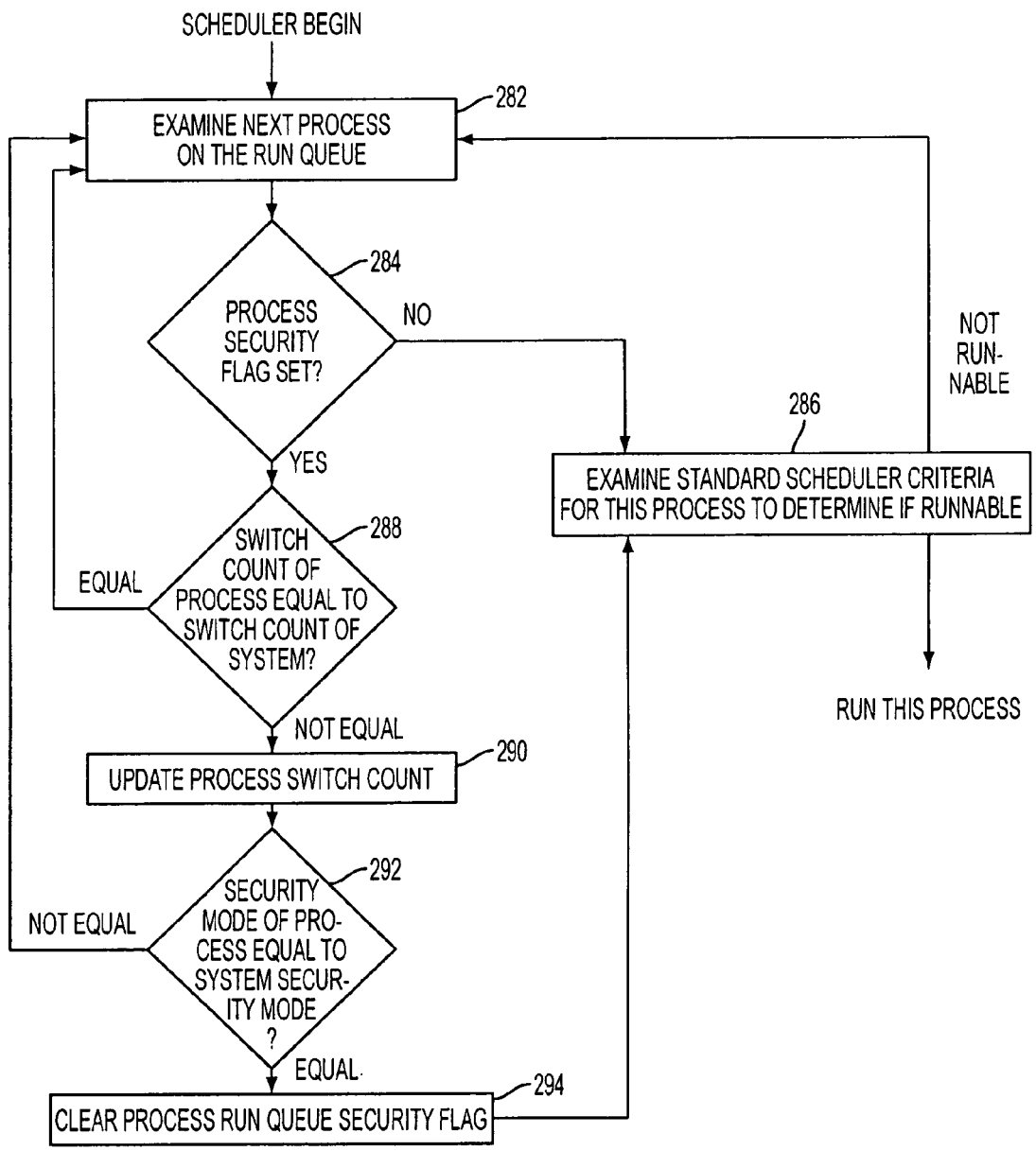
FIG. 14 shows a scheduler process.
Figure 15:
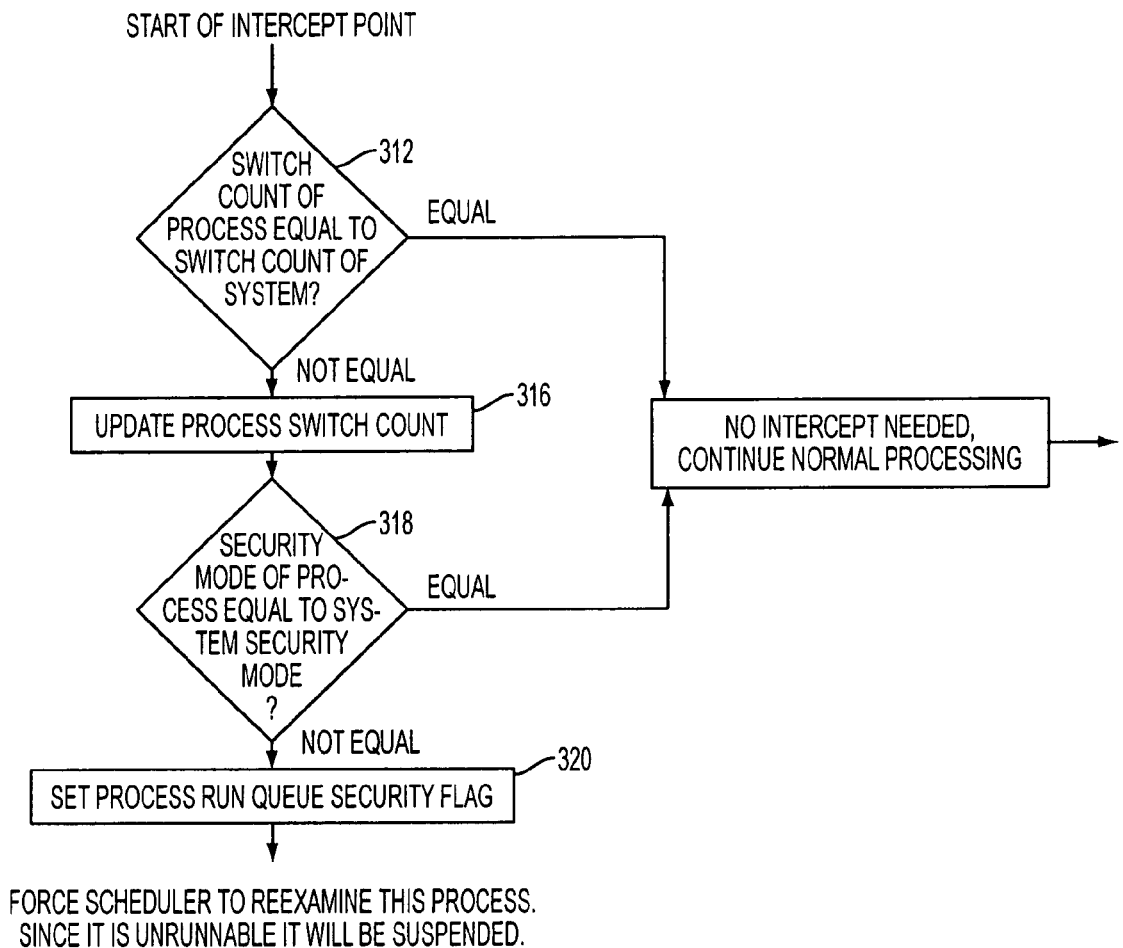
FIG. 15 shows an intercept point process.

The process scheduler 165 queue organization of the present invention, as depicted in FIG. 9, is similar to that of the conventional organization in that all of the processes (process structures with pointers to the processes), secure 166 and non-secure 164, are linked together in the kernel queue 162. However, in the non-secure mode only non-secure processes 164 are allowed to run while in the secure mode only the secure processes 166 are allowed to run. This is accomplished by adding a process state flag (run condition flag 266), not viewable to the user, to each of the conventional process thread data structures (164, 166) of the queue (see the description associated with FIG. 14 later herein). The process state flag indicates whether the process is secure or not. As the processes, secure or not secure, are loaded from corresponding devices and have appropriate secure process identifiers, the process state flag for each thread is set at the time that a process is loaded and the thread is placed on the queue. The conventional scheduler time sharing algorithms (are modified to) check the process state flag each time a next thread entry in the queue is accessed and only process threads that correspond to the security state are run. The modifications to the system flags and the scheduler discussed above are within the skill in the art.

Figure 10:
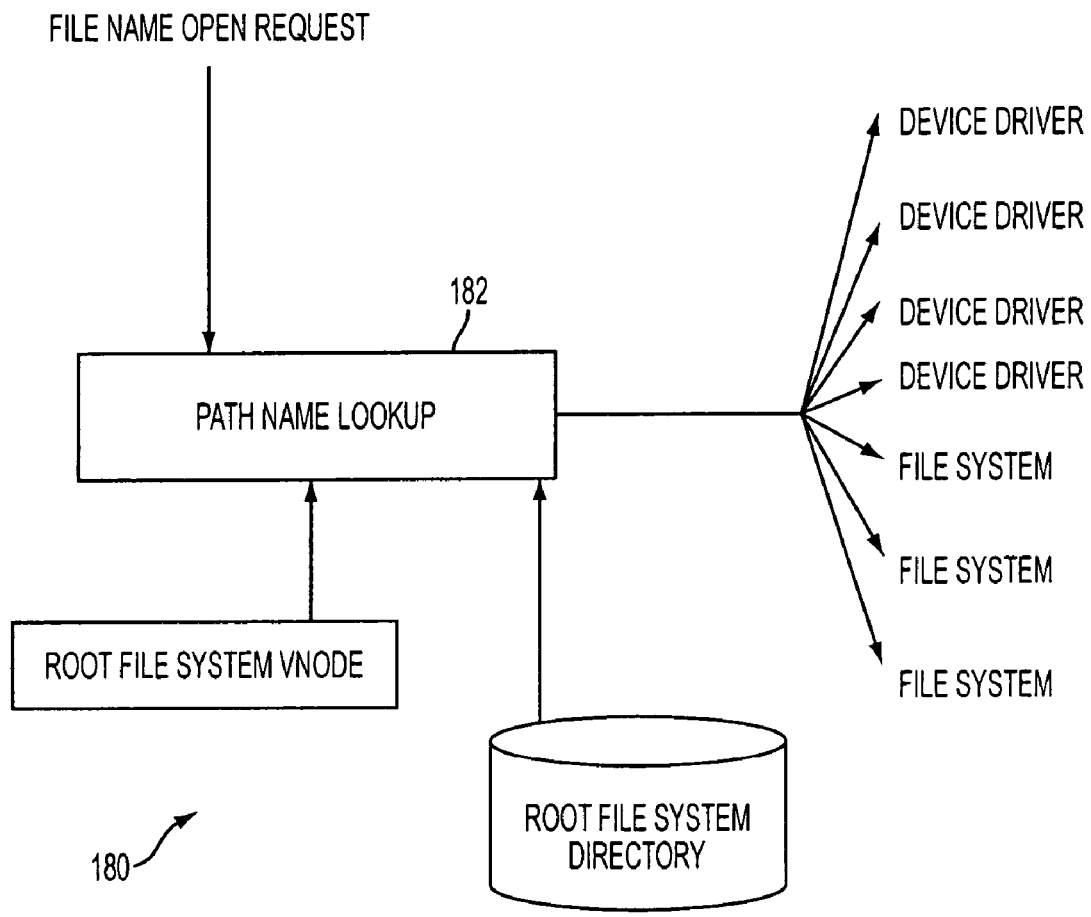
FIG. 10 shows a standard path name look-up function.

The conventional UNIX path name look-up system 180, as depicted in FIG. 10, receives a request to open a file with a file name or device name and the path name look-up function or object 182 examines the root file system vnode 184 and the root file system directory and the file/device name is conventionally converted by the path name look-up traversal to a device driver pointer or a file name pointer within the system. The pointer is then conventionally used by the system to perform any needed device or file access.

Figure 11:
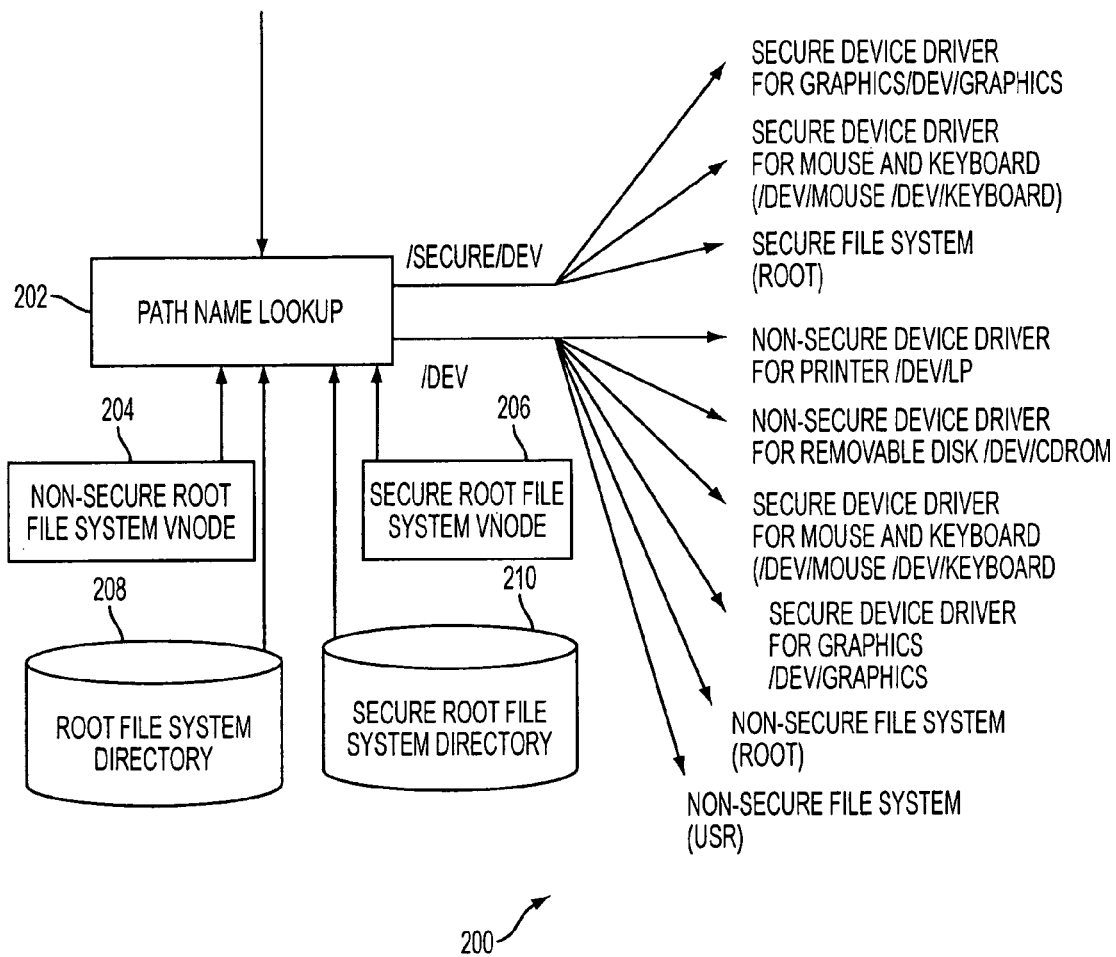
FIG. 11 shows a path name look-up function according to the present invention.

The path name look-up system 200 of the present invention, located in the kernel and as depicted in FIG. 11, receives a request to open a file with a file name or device name and the path name look-up function or object 202, depending on whether the system is in a secure or non-secure mode, examines the non-secure (204) or secure (206) root file system vnode both located on a non-secure device and the non-secure (208) or secure (210) root file system directory located on secure devices. The directories and nodes do not have entries for files or devices that cannot exist in their corresponding mode. By separating the vnodes and directories, a request for a non-secure file name or device will not result in a path name to a secure file or device and the file/device name is converted by the path name look-up traversal (or routed) to a secure device driver pointer or a secure file name pointer within the system that correlates to the security mode of the system. That is, a secure pointer only is returned when in the secure mode and visa versa. The secure pointer is then conventionally used by the system to perform any needed device or file access. Files that are open when a path switch occurs remain open but are not usable because access to the pointer thereto is not possible. This security mode based multilevel directory switching can be provided by a person of skill in the art familiar with the IRIX® operating system available from Silicon Graphics, Inc.

To prevent file systems designated as secure from being mounted and accessible to the non-secure mode, and vice versa, a physical device is identified internally to the kernel as the allowable root device of the secure mode. The designated secure root file system is not accessible due to a kernel data structure that has designated the security mode of the mounted file system. All subsequent file systems mounted within the hierarchy of the secure root file system cannot be accessed by the non-secure mode.

To further augment security, the secure file system may be physically protected and accessible only by providing some sort of authentication mechanism such as a biometric identification system.

Figure 12:
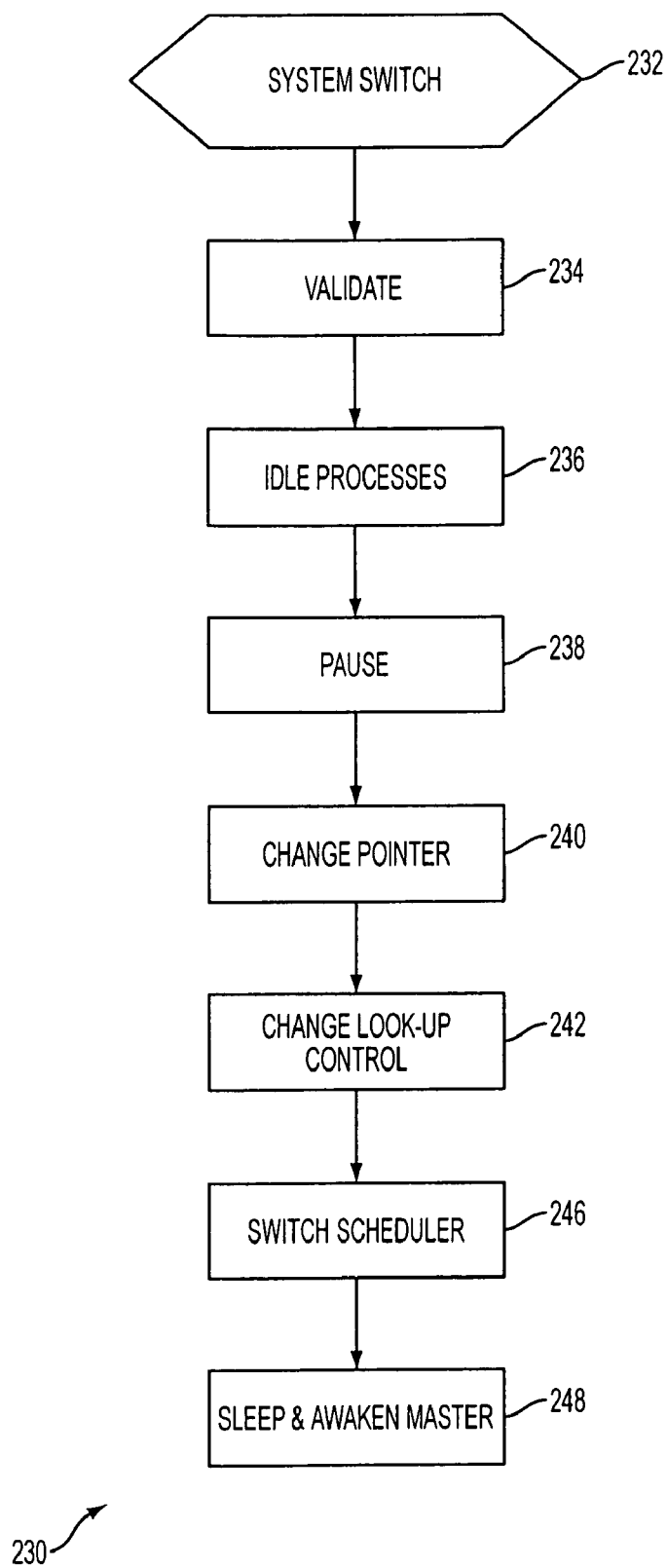
FIG. 12 illustrates the operations of a switch between non-secure and secure modes.

In converting from a non-secure system mode to a secure system mode, operations associated with changing the pointers, etc. need to be performed. Theses operations are depicted in the process 230 of FIG. 12. When a system switch is to occur 232, a system call is made by the non-secure master process ("init" in UNIX) to switch security modes at which time the kernel (not accessible by a user or user application) is entered and the switch process residing in the kernel is executed. First, the kernel validates 234 that this initiated switch process is authorized to initiate a switch. This involves the kernel performing authentication steps, such as determining whether the user has the authority to initiate a switch by checking a password, performing a biometric identification, etc. Once authentication is complete, the system enters an administrative state. The system sets a bit in the kernel system flags indicating that the system in a secure mode as discussed later herein. In this administrative state, the kernel switches the process scheduler 165, which decides what gets control of the CPU, to conventionally idle 236 all processes except the switch process (i.e. make them all unrunnable) and I/O paths are disabled. Then, the system pauses or waits a predetermined period of time to allow all processes time to reach a security checkpoint at which time they can be idled (see FIG. 16). 100 milliseconds is the preferred period of time for internal processes as this is typically sufficient in most systems for all processes to reach a check point where all data, pointers, states, etc. are not changing and can be preserved. For example, a non-secure file access that is in progress needs to be allowed to reach a stopping point where the hardware is essentially not active for the access. However, a pause time suitable for a particular system should be set. For example, if the system includes a telephone modem, a pause of 3 seconds would typically and preferably be appropriate. Once all processes have been idled, the operation changes 240 the process table pointer to point to the secure process hash table. That is, the pointer 138 is loaded in to pointer 140 as depicted in FIG. 7. Next, the system changes 242 the file name lookup control (see figure 200) to redirect all file name accesses to the secure root file system enabling I/O paths for secure data and processes. Now, the scheduler 165 is switched 246 to allow all secure processes to be runnable. Finally, this running switch process is set 248 to go to sleep and now that the system is allowing all secure processes to run, the secure init master process is awakened (the administrative mode is exited) and the secure processes are conventionally started or un-idled. (init is one of the only programs the kernel ever executes explicitly; the responsibility is on init to bring the secure UNIX system up, init always has the process ID and is typically called process 1.)

To switch from secure mode to non-secure mode, the kernel is entered and operations 234-238 are performed. Operation 240 changes the process table pointer to point to the non-secure process hash table while operation 242 changes the file name lookup control to redirect all file name accesses to the non-secure root file system. Operation 246 switches the scheduler to allow all non-secure processes to be runnable. And the system causes 248 this running switch process to sleep and as the system is now allowing all non-secure processes to run, the non-secure init master process is awakened.

Conventionally, during initial start-up (in non-secure mode) a cold start occurs in which the kernel is loaded and starts running. The kernel performs conventional housekeeping, such as data structure initialization, and then mounts the non-secure root file system. Once the root file system is mounted, the kernel looks for, loads and runs non-secure init (the non-secure master process). The master process reads a start-up file from a non-secure disk that controls a sequence of programs loads, etc. as defined in the start-up file that attach devices, windows generation, etc., the administrative mode is exited and non-secure processing commences. During processing, when an application is to be run, the master process conventionally forks a login process that allows log-in. The log-in process is then forked and then the new log-in process replaces itself with the application to be run. That is, all processes are children of the master process and inherit the security mode of the master. During processing the kernel knows, via the mode status bit or flag, whether it is in the secure mode. The system is also modified to include an initial secure load status flag that indicates whether the system has entered the secure mode for the first time. In the first switch to secure mode, that is, the first time that the system is switched to secure mode, the process hash table is empty and this needs to be addressed. To do this, the system recognizes that this is the first switch to secure mode by checking the initial secure load status flag. When it is the first secure mode switch, the kernel recognizes that this is a cold start for the secure mode and mounts the secure root file system. Once the secure root file system is mounted, the kernel looks for, loads and runs secure init (the secure master process). The secure master process reads a secure start-up file from disk that controls a sequence of programs loads, etc. as defined in the secure start-up file that allows secure log-in, windows generation, etc., sets the initial secure load status flag to show that the secure master process has been started, the administrative mode is exited and secure processing commences by forking the secure master and essentially replacing it with secure application processes. The forked/replaced child process inherits the unchangeable security level of the parent, in this case the secure master and it's secure status. In this way, all child processes are locked into their parent security status. By providing the initial secure load status flag, the system allows the secure mode to be started for the first time at any time. That is, the system could be started and run for several days before the secure mode is entered. The initial start of the system need not start both the non-secure and secure systems and the secure system need not be started until it is needed. A person of skill in the art can add the initial secure load status flag and make the changes to the kernel necessary to check this bit and perform a cold start for the secure side of the system.

The security mode flag that indicates whether the system is in the secure mode or the non-secure mode can be a multiple bit entity carrying a value, such as an integer value, that will allow the system to have multiple security levels and multiple secure systems running on the same platform. When the system is intended to run several levels of security then a multiple bit flag is preferred. When only a single secure system is resident on the system, the security level integer takes on values of 0 (non-secure) and 1 (secure).

Figure 13:
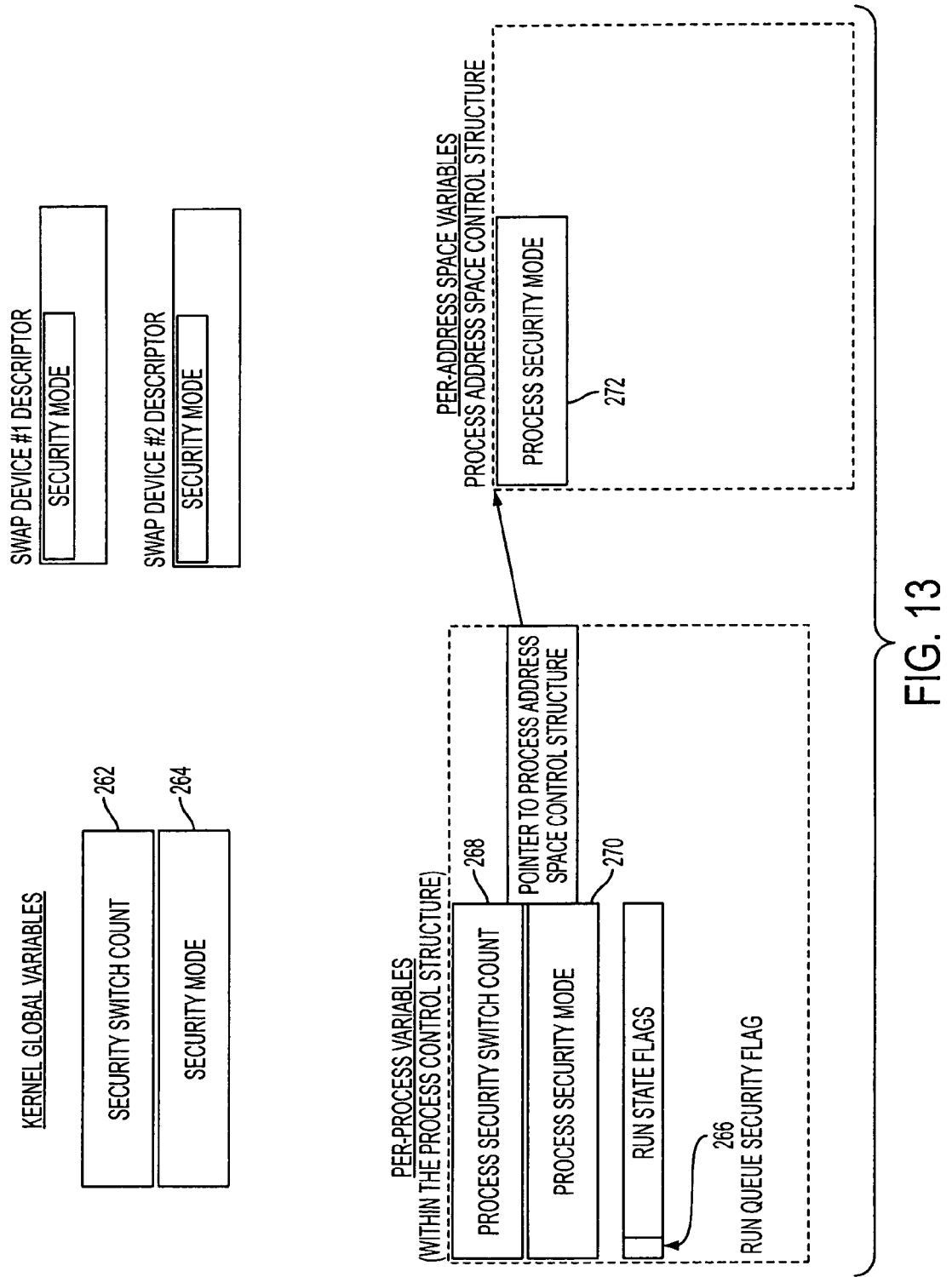
FIG. 13 depicts data structures of the present invention.

In the scheduler 86, there is an integer value 262, the switch count, (see FIG. 13) which is incremented upon notification of a switch to a new security mode. There is also an integer value 264 that designates the desired security mode. There is an additional flag bit 266 (security runnable flag) defined for each running process that designates whether or not the process can be allowed to run by the scheduler. Each process holds a copy 268 of the switch count at the time of last examination. Each process (and process space) keeps a security mode designator 270,272 to identify the security mode it is runnable on.

At the start of normal, non-secure processing after the initial boot up, the switch count is zero and each process has its switch count, security mode, and security runnable flag bit set to zero. The system operates normally.

At the time of a security mode change, the administrative process, which controls the switching, will increment the security switch count 262 by 1. The security mode 264 is set to the new security mode. All running processes are sequentially examined, and those with a security mode 270 not equal to the new security mode 264 will have the security runnable flag 266 set to a 1.

To do this, the process scheduler 86 examines 282 (see FIG. 14) each candidate process on the run queue to determine the next process to run. The security runnable flag 266 is examined 284 and any process with the flag not set in conventionally examined 286 with the standard scheduler criteria and run or not run. Any process on the run queue with a security runnable flag set is further examined to determine if the process is to remain un-runnable, or the process is designated as runnable in the new security mode and therefore must be made runnable. This further examination is optimized by comparing 288 the secure switch count 262 of the system with the secure switch count 268 of the process. If the counts are equal, there has been no change since last examination and the scheduler moves on to examine 282 the next process. If the counts are unequal, the process switch count 268 is updated 290. Then the security mode of the system is compared 292 to the security mode of the process. If the values are equal then the security runnable flag is cleared 294 and this process is now runnable if the other run criteria 286 are met. In this operation the security switch count of the process has been updated (290) to match the system wide secure switch count, so that no further examination by the scheduler is needed until the next switch operation occurs.

The above discussion deals with processes that are on the run queue. Some processes that can run are not on the run queue because their operation has been suspended, such as a process that is waiting for data to be loaded into a queue. These processes that can return to the run queue are captured or trapped at intercept points (see FIG. 16). When such a trap or intercept occurs, at the start of the intercept, the system compares 312 the secure switch count of the system with the secure switch count of the process. If the counts 262 and 268 are equal, no intercept is needed and normal processing continues 314. If the counts 262 and 268 are unequal, the process switch count 268 is updated 316. Then the security mode of the system is compared 318 to the security mode of the process. If the values are not equal then the security runnable flag is set 320 and the scheduler is forced to reexamine this process (where the scheduler will determine not run this process).

The present invention also handles page swapping in a secure manner. Page swapping occurs when virtual memory systems over commit the available physical memory and cause least recently used pages to be written out to disk in a swap area. In the present invention, the pages associated with secure applications are only swapped to a designated secure disk by the kernel, and likewise for non-secure applications to non-secure disks only. This is accomplished by the system recognizing the current mode (from the mode bit—see FIG. 13-264), having a list of secure and non-secure devices. When in a secure mode secure pages are swapped to secure devices and not secure pages are moved out to non-secure devices. That is, the swapper searches all process address spaces to swap out the least recently used pages. When a page is deemed to be swapped out, it is swapped to the swap device that has the same security mode (see FIG. 13) as the process address space security mode 272.

Figure 16:
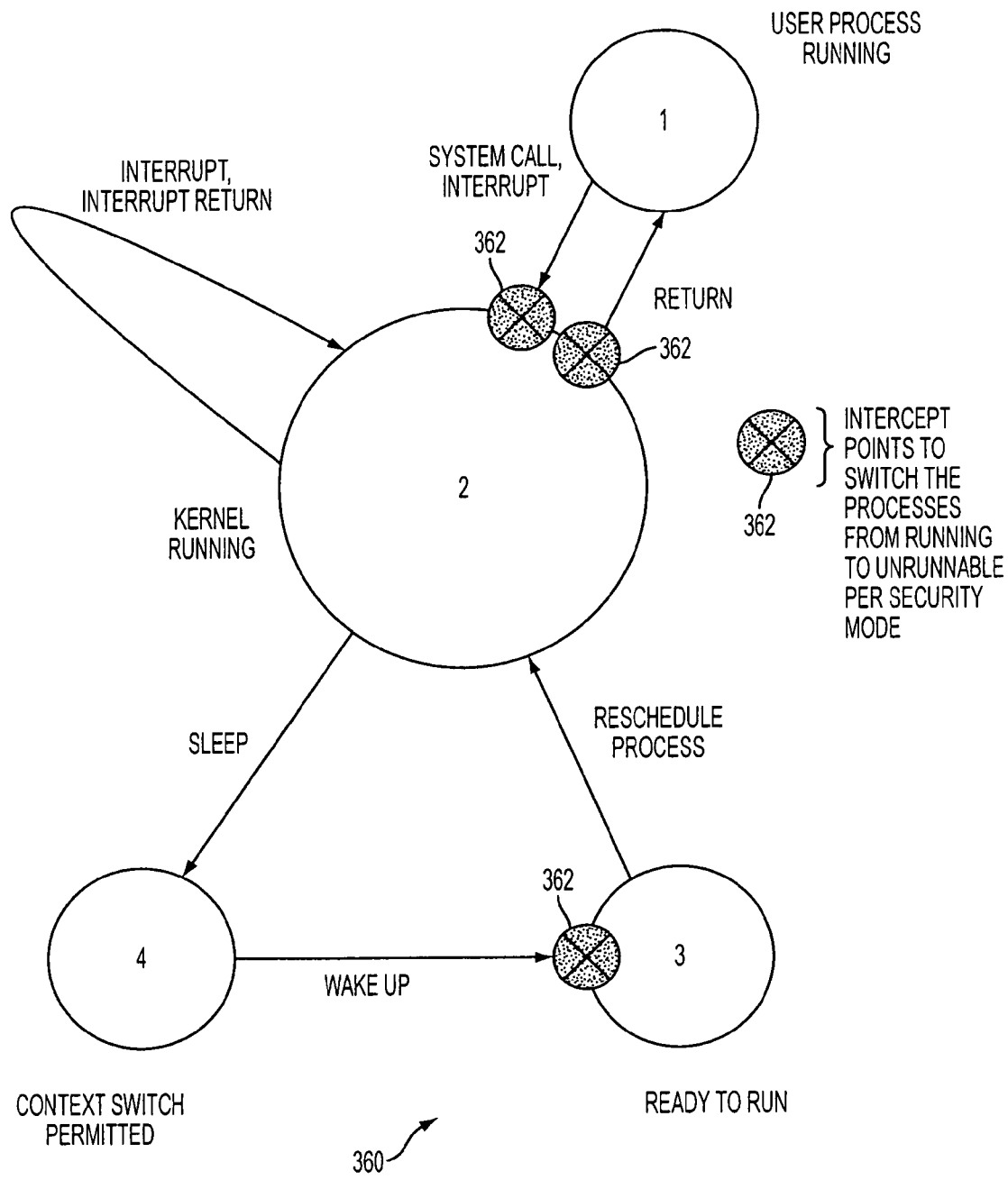
FIG. 16 depicts intercept points that allow processes to be marked as unrunnable.

As noted above, the switch from the non-secure to secure mode and back requires that processes be idled and made unrunnable. FIG. 16 depicts the typical operating states of a UNIX process 360 and the security check or intercept points 362 where processes can be switched to unrunnable. When the kernel state 2 transfers to an interrupt state, no security check points are available as interrupts, such as hardware buffer loading interrupt operation, must be allowed to finish. User processes 1 initiated by the scheduler have several intercept points 362 when a system call to the kernel occurs or when an interrupt is processed or when a return from a system call or interrupt occurs. A trap or intercept point 362 is also available between the sleep state 4 (where, for example, the process is awaiting an I/O completion and is not on the run queue) and the ready to run state 3 when a process is being awakened and is to be placed back on the run queue. Depending on the particulars states of other operating system kernels that may be other intercept/trap points.

Figure 17:
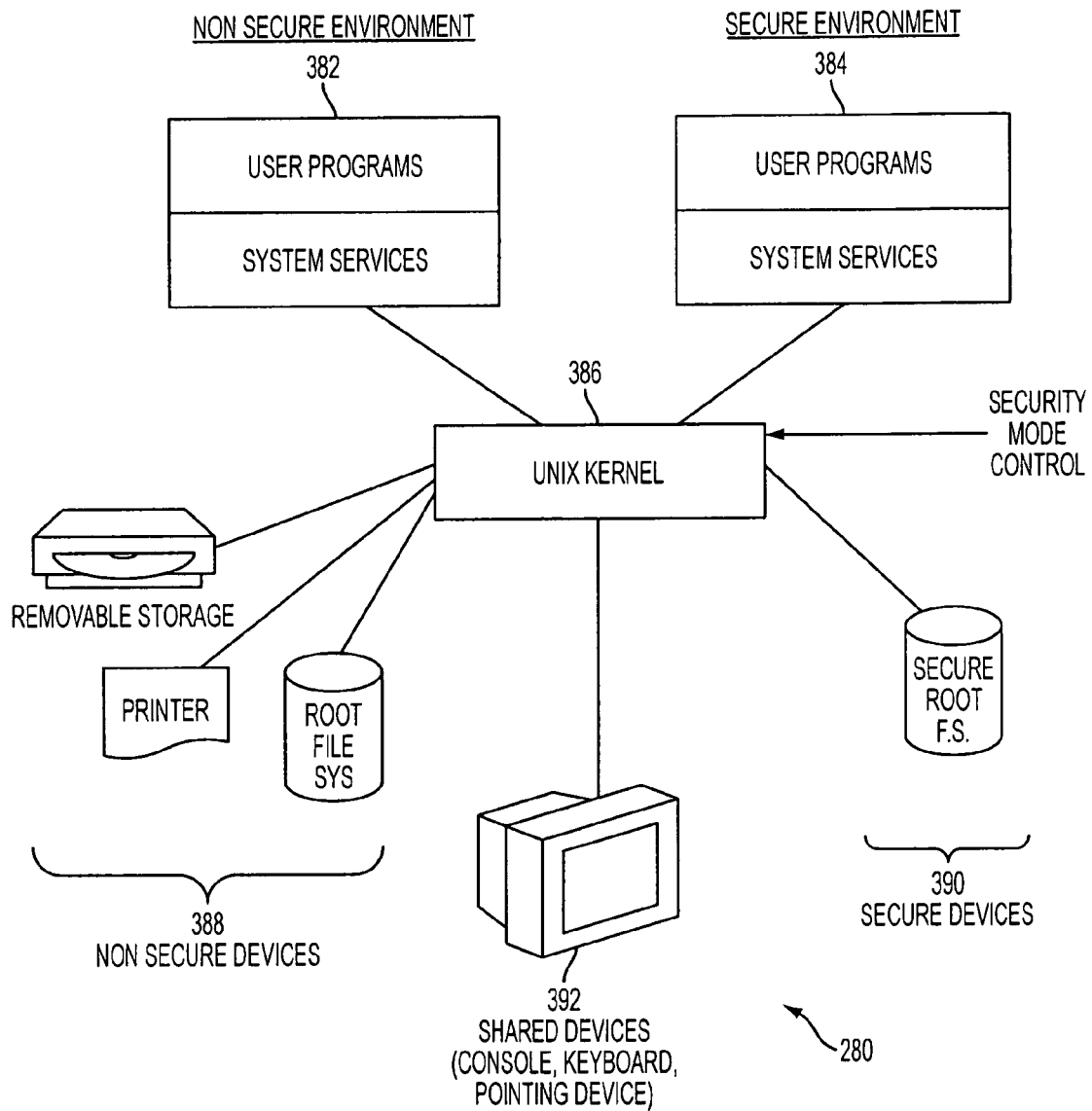
FIG. 17 depicts a dual mode system according to the present invention.

With the data structures and processes discussed above, the present invention allows secure processes to be run on the same platform 380 as non-secure processes as depicted in FIG. 17. A non-secure environment 382 is executable within the system kernel 286 as well as a secure environment 384. Non-secure devices 388 and secure devices 390 are both accessible by the shared devices 392.

The system also includes permanent or removable storage, such as magnetic and optical discs, RAM, ROM, etc. on which the process and data structures of the present invention can be stored and distributed. The processes can also be distributed via, for example, downloading over a network such as the Internet.

A system according to the present invention includes the storage, RAM, ROM, disc, etc. for storing the processes and data structures of the present invention discussed herein.

As noted above, during a switch the present invention includes a pause that allows the executing processes to reach an intercept point. It is possible, as an alternative, that rather than have a pause, the state of all of the processes can be tracked and any I/O can also be tracked, and when all processes have been idled and all I/O processes completed or terminated, the system can continue with the switch.

The present invention has been described with respect to providing a single path name look-up function. As an alternative, it is possible to have duplicated the function (like the dual hash tables), so that a function is available for non-secure look-ups and a function is available for secure look-ups.

The invention has been described with a single scheduler queue. As an alternative the scheduler queue could be duplicated.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer system, comprising:
   an access device;
   secure devices storing secure processes and secure data;
   non-secure devices storing non-secure processes and non-secure data; and
   a processor coupled to the secure devices, the non-secure devices and the access device, allowing access to the non-secure processes and non-secure data by a user using the access device and not allowing access by the user using the access device to the secure processes and secure data when in a non-secure mode;
   wherein said processor comprises a secure hash table having a secure hash table pointer, a non-secure hash table having a non-secure table pointer and a table pointer pointing to one of the secure and non-secure hash tables responsive to the mode and containing the secure hash table pointer when in the secure mode and containing the non-secure hash table pointer when in the non-secure mode.

2. A system as recited in claim 1, wherein said processor allows access to the secure processes and secure data by the user using the access device and does not allow access by the user using the access device to the non-secure processes and non-secure data when in a secure mode.

3. A system as recited in claim 1,
   wherein said processor switches between secure and non-secure modes as requested by the user.

4. A system as recited in claim 3, wherein said processor comprises:
   a process thread run queue storing process thread entries, where the process thread entries each comprises a flag indicating whether the thread comprises a secure process; and
   a scheduler allocating process time to only secure threads when in the secure mode and allocating process time to only non-secure threads when in the non-secure mode.

5. A system as recited in claim 4, wherein said queue stores non-secure and secure process thread entries.

6. A system as recited in claim 3, wherein said processor comprises a path name look-up function returning a secure device/file pointer only when in the secure mode.

7. A system as recited in claim 6, further comprising a secure file system directory stored on one of the secure devices and accessible only in the secure mode.

8. A system as recited in claim 1, wherein said processor performs page swaps with devices having a same security mode as the process.

9. A system as recited in claim 2, wherein the security mode comprises security levels, the secure processes and data have security levels and said processor allows access to the secure processes and secure data by the user using the access device responsive to a corresponding current security level.

10. A system as recited in claim 1,
    wherein said processor checks a security level of processes being awakened.

11. A computer system, comprising:
    an access device;
    secure devices storing secure processes and secure data;
    non-secure devices storing non-secure processes and non-secure data; and
    a processor coupled to the secure devices, the non-secure devices and the access device, allowing access to the non-secure processes and non-secure data by a user using the access device and not allowing access by the user using the access device to the secure processes and secure data when in a non-secure mode,
    wherein said processor comprises a secure hash table having a secure hash table pointer, a non-secure hash table having a non-secure table pointer and a table pointer pointing to one of the secure and non-secure hash tables responsive to the mode and containing the secure hash table pointer when in the secure mode and containing the non-secure hash table pointer when in the non-secure mode, and
    wherein said processor switches the contents of the table pointer responding to a switch between the modes.

12. A computer system, comprising:
   an access device;
   secure devices storing secure processes and secure data;
   non-secure devices storing non-secure processes and non-secure data; and
   a processor coupled to the secure devices, the non-secure devices and the access device, allowing access to the non-secure processes and non-secure data by a user using the access device and not allowing access by the user using the access device to the secure processes and secure data when in a non-secure mode;
   wherein said processor switches between secure and non-secure modes as requested by the user;
   wherein said processor, when a switch between the non-secure mode to the secure mode is requested, idles all processes, pauses for a predetermined period of time, changes a hash table pointer to point to a secure hash table, sets a path name look-up function to only return secure pointers, sets a process scheduler to allocate time to only secure threads, and awakens a secure master process.

13. A system as recited in claim 12, wherein said predetermined time comprises a time that will allow all processes to reach an intercept point.

14. A system as recited in claim 12, wherein said processor runs a secure master process during secure processing and the secure master process can be started at any time after system start-up.

15. A computer system, comprising:
   an access device;
   secure devices storing secure processes and secure data;
   non-secure devices storing non-secure processes and non-secure data; and
   a processor coupled to the secure devices, the non-secure devices and the access device, switching between secure and non-secure modes as requested by a user, allowing access to the non-secure processes and non-secure data by the user using the access device and not allowing access by the user using the access device to the secure processes and secure data when in a non-secure mode and allowing access to the secure processes and secure data by the user using the access device and does not allow access by the user using the access device to the non-secure processes and non-secure data when in a secure mode; said processor comprising:
   a secure hash table having a secure hash table pointer, a non-secure hash table having a non-secure table pointer and a table pointer pointing to one of the secure and non-secure hash tables responsive to the mode and containing the secure hash table pointer when in the secure mode and containing the non-secure hash table pointer when in the non-secure mode and said processor switching the contents of the table pointer responsive to the switching between secure and non-secure modes;
   a process thread run queue storing non-secure and secure process thread entries, where the process thread entries each comprises a flag indicating whether the thread comprises a secure process;
   a scheduler allocating process time to only secure threads when in the secure mode and allocating process time to only non-secure threads when in the non-secure mode responsive to a process switch count;
   a path name look-up function returning a secure device/file pointer only when in the secure mode;
   a secure file system directory stored on one of the secure devices and accessible only in the secure mode,
   wherein said processor, when a switch between the non-secure mode to the secure mode is requested, idles all processes, pauses for a predetermined period of time that will allow all processes to reach an intercept point where the process switch count can be updated, changes the table pointer to point to the secure hash table, sets a path name look-up function to only return secure pointers, sets a process scheduler to allocate time to only secure threads, and awakens a secure master process,
   wherein said processor runs a secure master process during secure processing and the secure master process can be started at any time after system start-up, and
   wherein said processor performs page swaps with devices having a same security mode as the process.

16. A method of controlling a single computer system including a processor, an access device, secure devices storing secure processes and secure data with a security level, and non-secure devices storing non-secure processes and non-secure data, said method comprising:
   allowing, by the processor, access to the non-secure processes and non-secure data by a user using the access device and not allowing access by the user using the access device to the secure processes and secure data when in a non-secure mode; and
   allowing, by the processor, access to the secure processes and secure data by the user using the access device corresponding to a current security level and not allowing access by the user using the access device to the non-secure processes and non-secure data when in a secure mode;
   pointing to a secure hash table when in the secure mode and pointing to a non-secure hash table when in the non-secure mode.

17. A method as recited in claim 16, further comprising:
   running only processes on a run queue that have a process security level corresponding to the current security level.

18. A method as recited in claim 16, further comprising:
   checking a security level of processes being awakened.

19. A non-transitory computer readable storage medium controlling a computer with a process stored thereon allowing, by the processor, access to the non-secure processes and non-secure data by a user using the access device and not allowing access by the user using the access device to the secure processes and secure data when in a non-secure mode; and allowing, by the processor, access to the secure processes and secure data by the user using the access device corresponding to a current security level and not allowing access by the user using the access device to the non-secure processes and non-secure data when in a secure mode, and providing a table pointer pointing to one of the secure and non-secure hash tables responsive to a mode, the table pointer containing the secure hash table pointer for a secure mode and containing the non-secure hash table pointer for a non-secure mode.

20. A non-transitory computer readable storage medium controlling a computer with a data structure, comprising:
   a secure hash table having a secure hash table pointer;
   a non-secure hash table having a non-secure hash table pointer; and
   a table pointer pointing to one of the secure and non-secure hash tables responsive to a mode, the table pointer containing the secure hash table pointer for a secure mode and containing the non-secure hash table pointer for a non-secure mode.

21. A non-transitory computer readable storage medium as recited in claim 20, further comprising a process security level mode for each process and a system security mode.

* * * * *